(12) United States Patent
Hayashi

(10) Patent No.: US 12,057,578 B2
(45) Date of Patent: Aug. 6, 2024

(54) NEGATIVE ELECTRODE FOR LITHIUM-ION SECONDARY BATTERY, AND LITHIUM-ION SECONDARY BATTERY

(71) Applicant: MURATA MANUFACTURING CO., LTD., Kyoto (JP)

(72) Inventor: Naoki Hayashi, Tokyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 627 days.

(21) Appl. No.: 17/232,870

(22) Filed: Apr. 16, 2021

(65) Prior Publication Data

US 2021/0242464 A1 Aug. 5, 2021

Related U.S. Application Data

(63) Continuation of application No. PCT/JP2019/039973, filed on Oct. 10, 2019.

(30) Foreign Application Priority Data

Oct. 18, 2018 (JP) .................... 2018-196348

(51) Int. Cl.
*H01M 4/60* (2006.01)
*H01M 4/04* (2006.01)
(Continued)

(52) U.S. Cl.
CPC ......... *H01M 4/604* (2013.01); *H01M 4/0433* (2013.01); *H01M 4/366* (2013.01);
(Continued)

(58) Field of Classification Search
CPC .... H01M 4/604; H01M 4/0433; H01M 4/366; H01M 4/386; H01M 4/583; H01M 4/623;
(Continued)

(56) References Cited

U.S. PATENT DOCUMENTS 9,083,059 B2 * 7/2015 Hayakawa ........ H01M 10/0567
9,876,225 B2 * 1/2018 Kawase ................ H01M 4/625
(Continued)

FOREIGN PATENT DOCUMENTS

CN 105917499 8/2016
JP 2007-273484 A 10/2007
(Continued)

OTHER PUBLICATIONS

Japanese Office Action issued Sep. 6, 2022 in corresponding Japanese Application No. 2020-553125.
(Continued)

*Primary Examiner* — Abdullah A Riyami
*Assistant Examiner* — Nader J Alhawamdeh
(74) *Attorney, Agent, or Firm* — K&L Gates LLP

(57) ABSTRACT

A lithium-ion secondary battery includes a positive electrode, a negative electrode, and an electrolytic solution. The negative electrode includes first negative electrode active material particles. The first negative electrode active material particles each include a center part and a covering part. The center part includes a silicon-containing material. The covering part is provided on a surface of the center part and includes a first compound and a second compound. The first compound includes at least one of polyacrylate or polyacrylamide. The second compound includes at least one of polyvinyl alcohol or polyvinyl acetal.

13 Claims, 6 Drawing Sheets

(51) Int. Cl.
   *H01M 4/36* (2006.01)
   *H01M 4/38* (2006.01)
   *H01M 4/583* (2010.01)
   *H01M 4/62* (2006.01)
   *H01M 4/66* (2006.01)
   *H01M 10/0525* (2010.01)
   *H01M 10/0568* (2010.01)
   *H01M 10/0569* (2010.01)
   *H01M 4/02* (2006.01)

(52) U.S. Cl.
   CPC ........... *H01M 4/386* (2013.01); *H01M 4/583* (2013.01); *H01M 4/623* (2013.01); *H01M 4/661* (2013.01); *H01M 10/0525* (2013.01); *H01M 10/0568* (2013.01); *H01M 10/0569* (2013.01); *H01M 2004/021* (2013.01); *H01M 2004/027* (2013.01); *H01M 2004/028* (2013.01); *H01M 2300/0025* (2013.01)

(58) Field of Classification Search
   CPC ............. H01M 4/661; H01M 10/0525; H01M 10/0568; H01M 10/0569; H01M 2004/021; H01M 2004/027; H01M 2004/028; H01M 2300/0025; H01M 4/134; H01M 4/622; H01M 4/625; Y02E 60/10
   See application file for complete search history.

(56) References Cited

U.S. PATENT DOCUMENTS

| | | | |
|---|---|---|---|
| 9,960,414 B2* | 5/2018 | Takamuku | B60L 58/26 |
| 2012/0009486 A1* | 1/2012 | Hayakawa | H01M 4/38 |
| | | | 429/339 |
| 2015/0155561 A1 | 6/2015 | Kim et al. | |

FOREIGN PATENT DOCUMENTS

| | | |
|---|---|---|
| JP | 2008-311067 A | 12/2008 |
| JP | 2013-152879 | 8/2013 |
| JP | 2015-053152 A | 3/2015 |
| JP | 2015-156328 A | 8/2015 |
| JP | 2016-076302 | 5/2016 |
| JP | 2017-084567 | 5/2017 |
| WO | 2017/026269 A1 | 2/2017 |
| WO | 2018/146865 | 8/2018 |

OTHER PUBLICATIONS

International Search Report mailed Dec. 24, 2019 in connection with PCT/JP2019/039973.

Chinese Office Action issued Dec. 27, 2023 in corresponding Chinese Application No. 201980066176.8.

* cited by examiner

NEGATIVE ELECTRODE FOR LITHIUM-ION SECONDARY BATTERY, AND LITHIUM-ION SECONDARY BATTERY

CROSS REFERENCE TO RELATED APPLICATIONS

The present application is a continuation of PCT patent application no. PCT/JP2019/039973, filed on Oct. 10, 2019, which claims priority to Japanese patent application no. JP2018-196348 filed on Oct. 18, 2018, the entire contents of which are being incorporated herein by reference.

BACKGROUND

The present technology generally relates to a negative electrode for use in a lithium-ion secondary battery, and a lithium-ion secondary battery that uses the negative electrode.

Various electronic apparatuses such as mobile phones have been widely used. Such widespread use has promoted the development of a lithium-ion secondary battery that is smaller in size and lighter in weight and allows for a higher energy density, as a power source.

Such a lithium-ion secondary battery includes a positive electrode, a negative electrode, and an electrolytic solution. In particular, a configuration of the negative electrode greatly influences battery characteristics. Accordingly, various considerations have been given to the configuration of the negative electrode.

Specifically, to improve a cyclability characteristic, a negative electrode active material is manufactured through processes including granulating a mixture of materials including graphite, silicon, and a void former, combining the granulated material with, for example, carbon black, and then firing the resulting material.

SUMMARY

The present technology generally relates to a negative electrode for use in a lithium-ion secondary battery, and a lithium-ion secondary battery that uses the negative electrode.

Electronic apparatuses, on which a lithium-ion secondary battery is to be mounted, are increasingly gaining higher performance and more functions, causing more frequent use of such electronic apparatuses and expanding a use environment of the electronic apparatuses. Accordingly, there is still room for improvement in terms of battery characteristics of the lithium-ion secondary battery.

The technology has been made in view of such an issue and it is an object of the technology to provide a negative electrode for a lithium-ion secondary battery, and a lithium-ion secondary battery that are able to achieve a superior battery characteristic.

A negative electrode for a lithium-ion secondary battery according to an embodiment of the technology includes first negative electrode active material particles. The first negative electrode active material particles each include a center part and a covering part. The center part includes a silicon-containing material. The covering part is provided on a surface of the center part and includes a first compound and a second compound. The first compound includes at least one of polyacrylate or polyacrylamide. The second compound includes at least one of polyvinyl alcohol or polyvinyl acetal.

A lithium-ion secondary battery according to an embodiment of the technology includes a positive electrode, a negative electrode, and an electrolytic solution. The negative electrode has a configuration similar to that of the negative electrode for a lithium-ion secondary battery of the embodiment of the technology described herein.

According to the negative electrode for a lithium-ion secondary battery, or the lithium-ion secondary battery of the respective embodiments of the technology, the negative electrode includes the first negative electrode active material particles having the configuration described above. This makes it possible to achieve a superior battery characteristic.

It should be understood that effects of the technology are not necessarily limited to those described above and may include any of effects described below in relation to the technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a negative electrode for a lithium-ion secondary battery according to an embodiment of the technology. Hereinafter, the negative electrode for a lithium-ion secondary battery according to the embodiment of the technology is simply referred to as a "negative electrode".

A lithium-ion secondary battery that uses the negative electrode described here is, as will be described later, a secondary battery that obtains a battery capacity by utilizing insertion and extraction of lithium.

Figure 1:
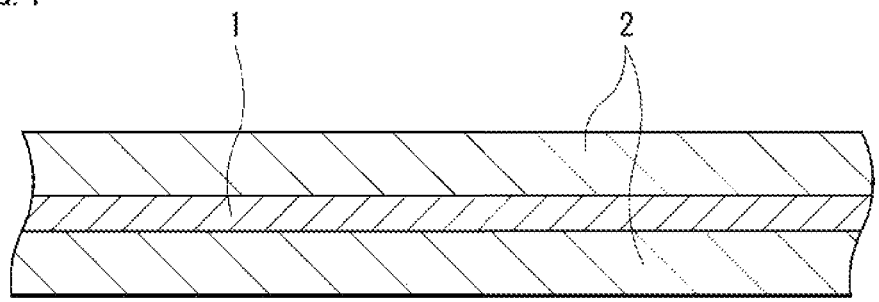
FIG. 1 is a sectional view of a configuration of a negative electrode for a secondary battery according to an embodiment of the technology.
Figure 2:
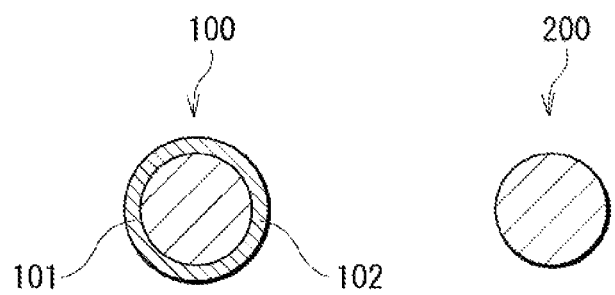
FIG. 2 is a schematic sectional view of a configuration of each of a first negative electrode active material particle and a second negative electrode active material particle according to an embodiment of the technology.

FIG. 1 illustrates a sectional configuration of the negative electrode. FIG. 2 schematically illustrates respective sectional configurations of a first negative electrode active material particle 100 and a second negative electrode active material particle 200.

As illustrated in FIG. 1, the negative electrode includes, for example, a negative electrode current collector 1, and a negative electrode active material layer 2 provided on the negative electrode current collector 1. It should be understood that the negative electrode active material layer 2 may be provided on only one side of the negative electrode current collector 1, or may be provided on each of both sides of the negative electrode current collector 1. FIG. 1 illustrates an example case where the negative electrode active material layer 2 is provided on each of both sides of the negative electrode current collector 1.

The negative electrode current collector 1 includes, for example, an electrically conductive material such as copper. It is preferable that the negative electrode current collector 1 have a surface roughened by a method such as an electrolysis method. A reason for this is that improved adherence of the negative electrode active material layer 2 to the negative electrode current collector 1 is achievable by utilizing a so-called anchor effect.

The negative electrode active material layer 2 includes a negative electrode active material into which lithium is insertable and from which lithium is extractable. Specifically, the negative electrode active material layer 2 includes, for example, two kinds of negative electrode active materials in the form of particles, that is, the first negative electrode active material particles 100 and the second negative electrode active material particles 200, as illustrated in FIG. 2. It should be understood that the negative electrode active material layer 2 may further include one or more of other materials including, without limitation, a negative electrode binder and a negative electrode conductor. FIG. 2 illustrates, for example, only one of the first negative electrode active material particles 100 and only one of the second negative electrode active material particles 200.

A reason why the negative electrode active material layer 2 includes the first negative electrode active material particles 100 and the second negative electrode active material particles 200 is that this helps to prevent the negative electrode from easily expand and contract upon charging and discharging, while securing a high theoretical capacity.

More specifically, as will be described later, the first negative electrode active material particles 100 each include a silicon-containing material, and the second negative electrode active material particles 200 each include a carbon-containing material. The silicon-containing material has an advantage of being high in theoretical capacity, but on the other hand, has an issue of easily expanding and contracting upon charging and discharging. In contrast, the carbon-containing material has an advantage of not easily expanding and contracting upon charging and discharging, but on the other hand, has an issue of being low in theoretical capacity. Accordingly, the combined use of the first negative electrode active material particles 100 including the silicon-containing material and the second negative electrode active material particles 200 including the carbon-containing material makes it possible to achieve a high theoretical capacity while reducing expansion and contraction of the negative electrode upon charging and discharging.

A mixture ratio (a weight ratio) between the first negative electrode active material particles 100 and the second negative electrode active material particles 200 is not particularly limited. It is preferable, in particular, that a proportion of a weight of the first negative electrode active material particles 100 to a sum total of the weight of the first negative electrode active material particles 100 and a weight of the second negative electrode active material particles 200 be greater than or equal to 10 wt % and less than 100 wt %. Hereinafter, the proportion of the weight of the first negative electrode active material particles 100 to the sum total of the weight of the first negative electrode active material particles 100 and the weight of the second negative electrode active material particles 200 will be referred to as a weight proportion. A reason why such a range of weight proportion is preferable is that the above-described advantage of the combined use of the first negative electrode active material particles 100 and the second negative electrode active material particles 200 is sufficiently achievable. The weight proportion is calculated as follows: weight proportion (wt %)=[weight of the first negative electrode active material particles 100/(weight of the first negative electrode active material particles 100+weight of the second negative electrode active material particles 200)]×100.

The negative electrode active material layer 2 is formed by, for example, one or more of methods such as a coating method. The coating method involves, for example, preparing a solution (slurry) including the negative electrode active material in a particle (powder) form and other materials including, without limitation, a negative electrode binder and a non-aqueous solvent (an organic solvent), and applying the slurry on the negative electrode current collector 1.

The first negative electrode active material particles 100 each include, as illustrated in FIG. 2, a center part 101 and a covering part 102.

The center part 101 includes a silicon-containing material. The term "silicon-containing material" is a generic term for a material that includes silicon as a constituent element. The silicon-containing material may include only silicon as its constituent element. The center part 101 may include only one kind of silicon-containing material, or two or more kinds of silicon-containing materials.

A reason why the center part 101 includes the silicon-containing material is that a higher energy density is achievable owing to the silicon-containing material having superior lithium insertion capacity and superior lithium extraction capacity.

The silicon-containing material is able to form an alloy with lithium. The silicon-containing material may be a simple substance of silicon, a silicon alloy, a silicon compound, a mixture of two or more thereof, or a material including one or more phases thereof. Further, the silicon-containing material may be crystalline or non-crystalline (amorphous), or may include both of a crystalline portion and a non-crystalline portion. It is to be noted that the simple substance described here merely refers to a simple substance in a general sense. The simple substance may therefore include a small amount of impurity, that is, does not necessarily have a purity of 100%.

The silicon alloy includes, as a constituent element or constituent elements other than silicon, for example, one or more of elements including, without limitation, tin, nickel, copper, iron, cobalt, manganese, zinc, indium, silver, titanium, germanium, bismuth, antimony, and chromium. The silicon compound includes, as a constituent element or constituent elements other than silicon, for example, one or more of elements including, without limitation, carbon and oxygen. The silicon compound may include, as a constituent element or constituent elements other than silicon, for example, one or more of the series of constituent elements described in relation to the silicon alloy.

Specific examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_{20}$, and $SiO_v$ (where $0<v\leq2$). It should be understood, however, that a range of "v" may be freely chosen, and may be, for example, $0.2<v<1.4$.

The covering part 102 is provided on a portion or all of a surface of the center part 101. Thus, the covering part 102 may cover only a portion of the surface of the center part 101 or all of the surface of the center part 101. Needless to say, in a case where the covering part 102 covers a portion of the surface of the center part 101, a plurality of covering parts 102 may be present on the surface of the center part 101.

The covering part 102 includes two specific kinds of compounds. Specifically, the covering part 102 includes a first compound and a second compound. The first compound is an acryl-based polymer compound, and the second compound is a vinyl-based polymer compound. The covering part 102 may include only one kind of first compound, or two or more kinds of first compounds. The covering part 102 may also include only one kind of second compound, or two or more kinds of second compounds.

A reason why the covering part 102 includes the first compound and the second compound together is as follows. The first compound reduces a decomposition reaction of an electrolytic solution. However, the covering part 102 including only the first compound results in a nonuniform distribution of covering by the covering part 102. In contrast, in a case where the covering part 102 includes the second compound together with the first compound, a uniform distribution of covering by the covering part 102 is achieved, and this makes it possible to reduce a rise in electrical resistance attributable to covering by the covering part 102, while reducing a decomposition reaction of the electrolytic solution. As a result, upon charging and discharging of the lithium-ion secondary battery including the negative electrode and an electrolytic solution described later, a decomposition reaction of the electrolytic solution on the surface of each of the first negative electrode active material particles 100 is reduced and also a rise in electrical resistance in each of the first negative electrode active material particles 100 is reduced while lithium ions are allowed to enter and exit each of the first negative electrode active material particles 100 smoothly and stably.

Regarding the covering part 102, parameters including, without limitation, thickness and covering rate are freely chosen. In particular, the covering part 102 preferably has a thickness that is enough to protect the center part 101 physically and chemically without hindering lithium ions from entering and exiting the center part 101 as described above. The same goes for the covering rate.

The first compound, i.e., an acryl-based polymer compound, includes polyacrylate, poly acrylamide, or both. A reason for this is that a film derived from the first compound performs a function similar to that of an SEI (solid electrolyte interphase) film. As a result, even if the covering part 102 is provided on the surface of the center part 101, entering and exiting of the lithium ions into/from the center part 101 are less hindered by the covering part 102. Furthermore, a decomposition reaction of the electrolytic solution associated with reactivity of the center part 101 is reduced by the covering part 102.

Examples of the kinds of the polyacrylate include, and are not limited to, a metal salt and an onium salt. It is to be noted that the polyacrylate described here is not limited to a compound in which all carboxyl groups (—COOH) included in the polyacrylic acid form salt, and may be a compound in which some of the carboxyl groups included in the polyacrylic acid form salt. The latter polyacrylate may thus include one or more carboxyl groups.

A metal ion included in the metal salt is not limited to a particular kind, and may be, for example, an alkali metal ion. More specific examples thereof include a lithium ion, a sodium ion, and a potassium ion. Specific examples of the polyacrylate thus include lithium polyacrylate, sodium polyacrylate, and potassium polyacrylate.

An onium ion included in the onium salt is not limited to a particular kind. Examples of the onium ion include an ammonium ion and a phosphonium ion. Specific examples of the polyacrylate thus include ammonium polyacrylate and phosphonium polyacrylate.

It is to be noted that the polyacrylate may include only the metal ion, only the onium ion, or both of the metal ion and the onium ion in one molecule. In this case also, the polyacrylate may include one or more carboxyl groups as described above.

Although not particularly limited, the content of the first compound in the covering part 102 is preferably within a range from 0.1 wt % to 10 wt %, both inclusive, in particular. A reason for this is that such a range of content allows for formation of a stable film derived from the first compound, thus serving to further reduce a decomposition reaction of the electrolytic solution and further reduce a rise in electrical resistance. More specifically, if the content of the first compound is less than 0.1 wt %, formation of a stable film derived from the first compound becomes difficult, and it can thus become difficult to reduce a decomposition reaction of the electrolytic solution. In contrast, if the content of the first compound is greater than 10 wt %, electrical resistance can tend to rise due to the presence of such a film, and a reduction in energy density can tend to result from a decrease in the content of the center part 101 (a silicon-containing material) in the first negative electrode active material particle 100.

The second compound, i.e., a vinyl-based polymer compound, includes polyvinyl alcohol, polyvinyl acetal, or both. A reason for this is that a film derived from the second compound performs a function similar to that of an SEI film, as does the film derived from the first compound described above. It is to be noted that, while polyvinyl alcohol is synthesized by using, for example, vinyl acetate, not all of acetic acid groups have to be substituted by hydroxyl groups in the polyvinyl alcohol. In other words, the polyvinyl alcohol may include a desired number of acetic acid groups, for example. Likewise, in polyvinyl acetal that is synthesized by using, for example, vinyl acetate, not all of acetic acid groups have to be substituted by hydroxyl groups. Therefore, the polyvinyl acetal may include a desired number of acetic acid groups.

Specific examples of the polyvinyl acetal include polyvinyl formal, polyvinyl butyral, and a copolymer of polyvinyl formal and polyvinyl butyral. The copolymer may be a random copolymer, a block copolymer, or a graft copolymer.

Although not particularly limited, the content of the second compound in the covering part 102 is preferably within the range from 0.1 wt % to 10 wt %, both inclusive, in particular, for a reason similar to that described in relation to the content of the first compound in the covering part 102. That is, such a range of content allows for formation of a stable film derived from the second compound, thus serving to further reduce a decomposition reaction of the electrolytic solution and further reduce a rise in electrical resistance.

The covering part 102 may further include, for example, an electrically conductive substance, together with the first compound and the second compound described above. A reason for this is that an improved electrical conductivity of the covering part 102 is achievable through a reduction in electrical resistance of the covering part 102. The covering part 102 may include only one kind of electrically conductive substance, or two or more kinds of electrically conductive substances.

Examples of the electrically conductive substance include a carbon nanotube, a single-walled carbon nanotube, a carbon nanofiber, carbon black, and acetylene black. A reason for this is that a high electrical conductivity is achievable. The carbon nanotube described here refers to a multi-walled carbon nanotube, that is, a carbon nanotube having a multilayer structure. In contrast, the single-walled carbon nanotube has a single-layer structure.

Although not particularly limited, the content of the electrically conductive substance in the covering part 102 is preferably within a range from 0.001 wt % to 20 wt %, both inclusive, in particular. A reason for this is that a sufficient electrical conductivity is achievable while an amount of formation of the film derived from each of the first compound and the second compound is ensured. More specifically, if the content of the electrically conductive substance is less than 0.001 wt %, it can be difficult to effectively improve the electrical conductivity. In contrast, if the content of the electrically conductive substance is greater than 20 wt %, a reduction in energy density can tend to result from a decrease in the proportion of the center part 101 (a silicon-containing material) in the first negative electrode active material particle 100.

Figure 3:
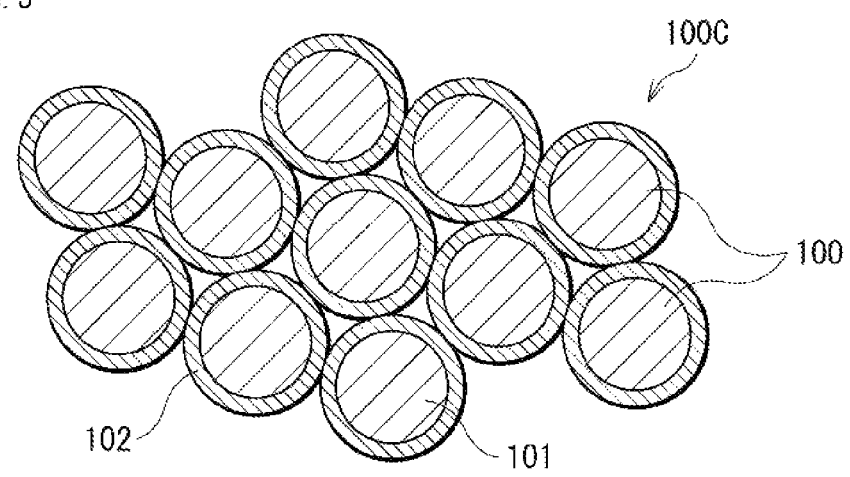
FIG. 3 is a schematic sectional view of a configuration of a composite particle formed by the first negative electrode active material particles according to an embodiment of the technology.

For example, as illustrated in FIG. 3 corresponding to FIG. 2, two or more of the first negative electrode active material particles 100 preferably gather closely together to form an aggregate (i.e., a composite particle 100C). In other words, the negative electrode active material layer 2 preferably includes the composite particle 100C that includes two or more of the first negative electrode active material particles 100 in close contact with each other. The number of the composite particles 100C to be included in the negative electrode active material layer 2 is not particularly limited, and may be only one or may be two or more. FIG. 3 illustrates a single composite particle 100C as an example.

The composite particle 100C described here is not a mere aggregate of two or more of the first negative electrode active material particles 100. The composite particle 100C is a structure in which two or more of the first negative electrode active material particles 100 are tightly bound to each other via the covering part 102 functioning as a binder.

The formation of the composite particle 100C by two or more of the first negative electrode active material particles 100 provides the following advantages. Firstly, a decomposition reaction of the electrolytic solution at the surface of the first negative electrode active material particle 100 is reduced owing to a reduction in surface area. Secondly, a conduction path for lithium ions is secured inside the composite particle 100C owing to the binding between the first negative electrode active material particles 100. Thirdly, a movement path for the lithium ions is secured owing to formation of a gap (a diffusion path for the lithium ions) between the first negative electrode active material particles 100. As a result, the composite particle 100C decreases in electrical resistance, and it becomes easier for the lithium ions to enter and exit the composite particle 100C.

The number of the first negative electrode active material particles 100 forming a single composite particle 100C is not particularly limited. For simplifying illustration, FIG. 3 illustrates an example case where eleven first negative electrode active material particles 100 form a single composite particle 100C.

It is to be noted that the negative electrode active material layer 2 may include, together with the composite particle 100C, one or more first negative electrode active material particles 100 not involved in the formation of any composite particle 100C, that is, one or more free first negative electrode active material particles 100. In other words, not all of the first negative electrode active material particles 100 have to form any composite particle 100C, and some of the first negative electrode active material particles 100 may form no composite particle 100C.

It becomes easier to form the composite particle 100C in a case where, for example, a specific method is used to form the first negative electrode active material particles 100. One example of the specific method is a spray drying method. Details of the method of forming the composite particle 100C will be described later.

The second negative electrode active material particles 200 each include a carbon-containing material. The term "carbon-containing material" is a generic term for a material that includes carbon as a constituent element. The carbon-containing material may include only carbon as its constituent element. The second negative electrode active material particles 200 may each include only one kind of carbon-containing material, or two or more kinds of carbon-containing materials.

A reason why the second negative electrode active material particles 200 each include the carbon-containing material is that the carbon-containing material hardly changes in crystal structure upon insertion and extraction of lithium, and the carbon-containing material also serves as an electrical conductor. This allows a high energy density to be obtained stably, and improves the negative electrode active material layer 2 in electrical conductivity.

Specific examples of the carbon-containing material include graphitizable carbon, non-graphitizable carbon, and graphite. It is to be noted that spacing of a (002) plane of the non-graphitizable carbon is, for example, greater than or equal to 0.37 nm, and spacing of a (002) plane of the graphite is, for example, smaller than or equal to 0.34 nm.

More specific examples of the carbon-containing material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is a resultant of firing or carbonizing a polymer compound such as a phenol resin or a furan resin at a freely chosen temperature. Other than the above, the carbon-containing material may be low-crystalline carbon heat-treated at a temperature of about 1000° C. or lower, or may be amorphous carbon, for example.

Examples of the shape of the second negative electrode active material particle 200 include, and are not particularly limited to, a fibrous shape, a spherical shape (particulate shape), and a scale-like shape. FIG. 2 illustrates an example case where the second negative electrode active material particle 200 has a spherical shape. Needless to say, there may coexist two or more of the second negative electrode active material particles 200 that are different in shape from each other.

The negative electrode binder includes, for example, one or more of materials including, without limitation, a synthetic rubber and a polymer compound. Examples of the synthetic rubber include a styrene-butadiene-based rubber. Examples of the polymer compound include polyvinylidene difluoride, polyimide, and aramid. A reason for this is that the first negative electrode active material particles 100 and the second negative electrode active material particles 200 are brought into sufficiently close contact with each other via such a negative electrode binder.

For example, the negative electrode active material layer 2 may further include one or more of other negative electrode active materials, together with the above-described two kinds of negative electrode active materials (the first negative electrode active material particles 100 and the second negative electrode active material particles 200).

Examples of the other negative electrode active materials include a metal-based material. The term "metal-based material" is a generic term for a material that includes one or more of metal elements and metalloid elements, as a constituent element or constituent elements. A reason for this is that a high energy density is achievable.

The metal-based material may be a simple substance, an alloy, a compound, a mixture of two or more thereof, or a material including one or more phases thereof. It should be understood that the "alloy" encompasses not only a material that includes two or more metal elements but may also encompass a material that includes one or more metal elements and one or more metalloid elements. The "alloy" may further include one or more non-metallic elements. The metal-based material has a state such as a solid solution, a eutectic (a eutectic mixture), an intermetallic compound, or a state including two or more thereof that coexist.

The metal element and the metalloid element are each able to form an alloy with lithium. Specific examples of the metal element and the metalloid element include magnesium, boron, aluminum, gallium, indium, silicon, germanium, tin, lead, bismuth, cadmium, silver, zinc, hafnium, zirconium, yttrium, palladium, and platinum.

Among the above-described materials, silicon or tin is preferable, and silicon is more preferable. A reason for this is that a markedly high energy density is obtainable owing to superior lithium insertability and superior lithium extractability thereof as described above.

The metal-based material may specifically be a simple substance of silicon, a silicon alloy, a silicon compound, a simple substance of tin, a tin alloy, a tin compound, a mixture of two or more thereof, or a material including one or more phases thereof. The simple substance described here is as defined above.

Details of the silicon alloy and the silicon compound are as described above. The tin alloy includes, for example, one or more of elements including, without limitation, silicon, nickel, copper, iron, cobalt, manganese, zinc, indium, silver, titanium, germanium, bismuth, antimony, and chromium as a constituent element or constituent elements other than tin. The tin compound includes one or more of elements including, without limitation, carbon and oxygen as a constituent element or constituent elements other than tin. The tin compound may include, as a constituent element or constituent elements other than tin, one or more of the series of constituent elements described in relation to the tin alloy, for example. Specifically, examples of the tin alloy and the tin compound include $SnO_w$ (where $0<w\leq 2$), $SnSiO_3$, and $Mg_2Sn$.

The negative electrode is manufactured by the following procedure, for example.

First, a plurality of center parts 101, the first compound, the second compound, and other materials including, without limitation, an aqueous solvent, are mixed together. The center parts 101 each include the silicon-containing material. Thereafter, the mixture is stirred. Conditions including a method of stirring and conditions of stirring are not particularly limited. The center parts 101 are thereby dispersed in the aqueous solvent, and each of the first compound and the second compound is dissolved by the aqueous solvent. An aqueous dispersion including the center parts 101, the first compound, and the second compound is thereby prepared.

The aqueous solvent is not limited to a particular kind, and may be, for example, pure water. As the first compound, for example, a non-dissolved material may be used or a dissolved material may be used. The dissolved material is, for example, a solution in which the first compound is dissolved by a solvent such as pure water, and is a so-called aqueous solution of the first compound. Likewise, as the second compound, either a non-dissolved material or a dissolved material may be used.

In a case of using the electrically conductive substance, a similar procedure is performed except that the electrically conductive substance is added to the above-described mixture. The electrically conductive substance is thereby dispersed in the aqueous solvent, resulting in an aqueous dispersion including the center parts 101, the first compound, the second compound, and the electrically conductive substance.

Thereafter, using a spray dryer, the aqueous dispersion is sprayed and then the sprayed material is dried. Conditions including a method of drying and a drying temperature are not particularly limited. The covering part 102 including the first compound and the second compound is thereby formed on the surface of each of the center parts 101. The first negative electrode active material particles 100 are thus obtained.

In this case, by the use of the spray drying method, two or more of the first negative electrode active material particles 100, while the first negative electrode active material particles 100 are being formed, come into close contact with each other to form the composite particle 100C.

Thereafter, the first negative electrode active material particles 100, the second negative electrode active material particles 200 each including the carbon-containing material, and other materials including, without limitation, a negative electrode binder and a non-aqueous solvent are mixed together, and the mixture is stirred. Conditions including a method of stirring and conditions of stirring are not particularly limited.

The non-aqueous solvent is not limited to a particular kind and may be any one or more of materials that are able to disperse each of the first negative electrode active material particles 100 and the second negative electrode active material particles 200 therein and able to dissolve the negative electrode binder. The non-aqueous solvent is, for example, an organic solvent such as N-methyl-2-pyrrolidone.

The negative electrode binder is thus dissolved by the non-aqueous solvent, and consequently, a non-aqueous dispersion in a paste form is prepared that includes the first negative electrode active material particles 100, the second negative electrode active material particles 200, and the negative electrode binder. The non-aqueous dispersion in a paste form is a so-called slurry.

Lastly, the non-aqueous dispersion is applied on both sides of the negative electrode current collector 1, following which the applied non-aqueous dispersion is dried. As a result, the negative electrode active material layers 2 including the first negative electrode active material particles 100 and the second negative electrode active material particles 200 are formed to complete the negative electrode.

Thereafter, the negative electrode active material layers 2 may be compression-molded by means of a machine such as a roll pressing machine. In this case, the negative electrode active material layers 2 may be heated. The negative electrode active material layers 2 may be compression-molded a plurality of times. Conditions of compression and conditions of heating are not particularly limited.

The negative electrode includes the first negative electrode active material particles 100 and the second negative electrode active material particles 200. The first negative electrode active material particles 100 each include the center part 101 that includes the silicon-containing material, and the covering part 102 that includes both of the first compound and the second compound. The second negative electrode active material particles 200 each include the carbon-containing material. The first compound includes, without limitation, polyacrylate. The second compound includes, without limitation, polyvinyl alcohol.

In this case, as described above, a uniform distribution of covering by the covering part 102 is achieved. This reduces a decomposition reaction of the electrolytic solution, and also reduces a rise in electrical resistance. Accordingly, upon charging and discharging of the lithium-ion secondary battery including the negative electrode and the electrolytic solution, a decomposition reaction of the electrolytic solution is reduced and also a rise in electrical resistance is reduced at each of the first negative electrode active material particles 100 while lithium ions are allowed to enter and exit each of the first negative electrode active material particles 100 smoothly and stably. Consequently, it is possible to improve battery characteristics of the lithium-ion secondary battery using the negative electrode.

In particular, the first negative electrode active material particles 100 may form a plurality of composite particles 100C. In such a case, electrical resistance decreases at the composite particles 100C and it becomes easier for the lithium ions to enter and exit the composite particles 100C. Consequently, it is possible to achieve higher effects.

The first compound (polyacrylate) may include, without limitation, lithium polyacrylate, and the second compound (polyvinyl acetal) may include, without limitation, polyvinyl formal. In such a case, even if the covering part 102 is provided on the surface of the center part 101, entering and exiting of lithium ions into/from the center part 101 are less hindered by the covering part 102. In addition, a decomposition reaction of the electrolytic solution associated with reactivity of the center part 101 is reduced by the covering part 102. Consequently, it is possible to achieve higher effects.

Further, the content of the first compound in the covering part 102 may be within the range from 0.1 wt % to 10 wt %, both inclusive, and the content of the second compound in the covering part 102 may be within the range from 0.1 wt % to 10 wt %, both inclusive. This allows for formation of a stable film derived from each of the first compound and the second compound. This serves to further reduce a decomposition reaction of the electrolytic solution and further reduce a rise in electrical resistance, thus making it possible to achieve higher effects.

Further, the covering part 102 may include the electrically conductive substance. This improves electrical conductivity of the covering part 102 to make it possible to achieve higher effect. In this case, the electrically conductive substance may include a carbon nanotube, for example. This sufficiently improves electrical conductivity of the covering part 102 to achieve even higher effects. Further, the content of the electrically conductive substance in the covering part 102 may be within the range from 0.001 wt % to 20 wt %, both inclusive. This provides sufficient electrical conductivity while securing an amount of formation of the film derived from each of the first compound and the second compound, thus making it possible to achieve even higher effects.

Further, the weight proportion, that is, the proportion of the weight of the first negative electrode active material particles 100 to the sum total of the weight of the first negative electrode active material particles 100 and the weight of the second negative electrode active material particles 200, may be greater than or equal to 10 wt % and less than 100 wt %. This sufficiently provides the advantage of the combined use of the first negative electrode active material particles 100 and the second negative electrode active material particles 200, thus making it possible to achieve higher effects.

Next, a description is given of a lithium-ion secondary battery according to an embodiment of the technology including the negative electrode described above.

The lithium-ion secondary battery described here includes a positive electrode 21 and a negative electrode 22, as will be described later. The lithium-ion secondary battery is, for example, a secondary battery that obtains a capacity of the negative electrode 22 by utilizing insertion and extraction of lithium.

In this lithium-ion secondary battery, a charge capacity of the negative electrode 22 is greater than a discharge capacity of the positive electrode 21 in order to prevent unintentional precipitation of lithium metal on a surface of the negative electrode 22 during charging, for example.

As an example of the lithium-ion secondary battery, a lithium-ion secondary battery of a cylindrical type will be described first.

Figure 4:
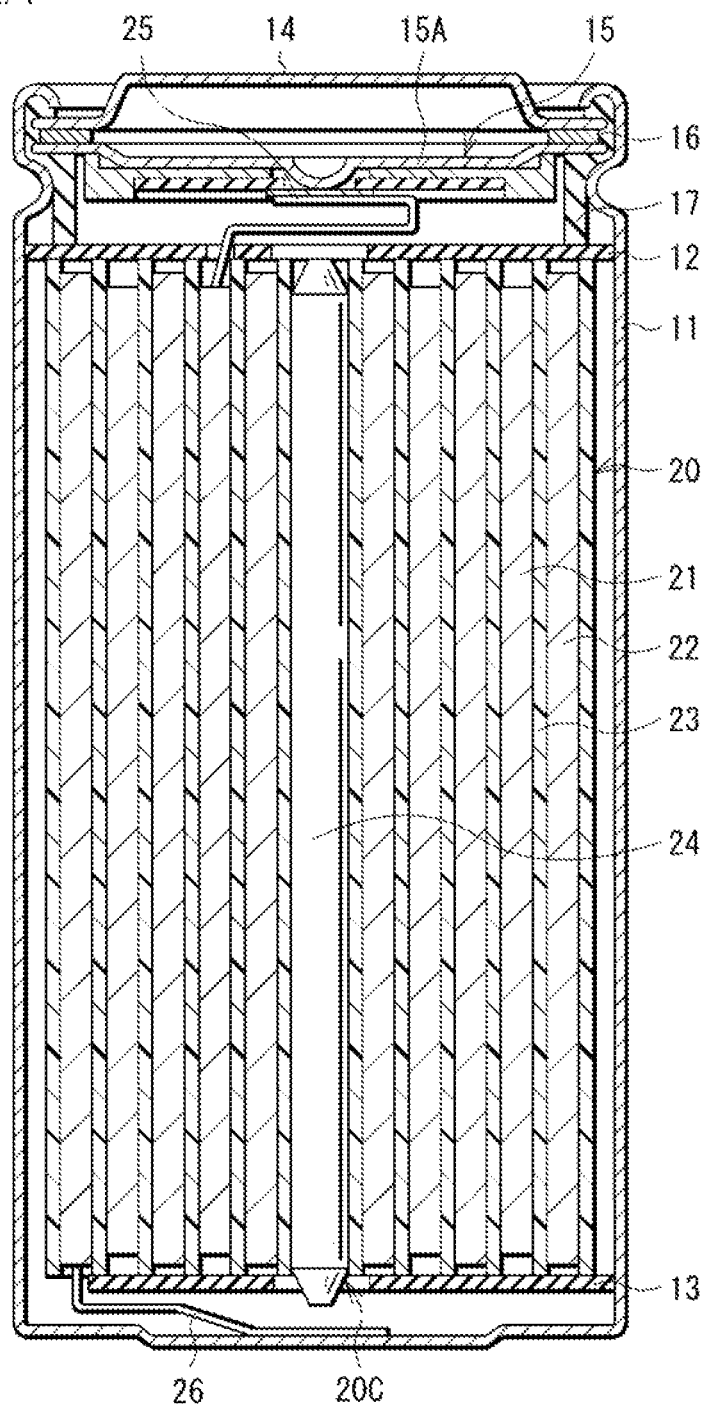
FIG. 4 is a sectional view of a configuration of a lithium-ion secondary battery (cylindrical type) according to an embodiment of the technology.
Figure 5:
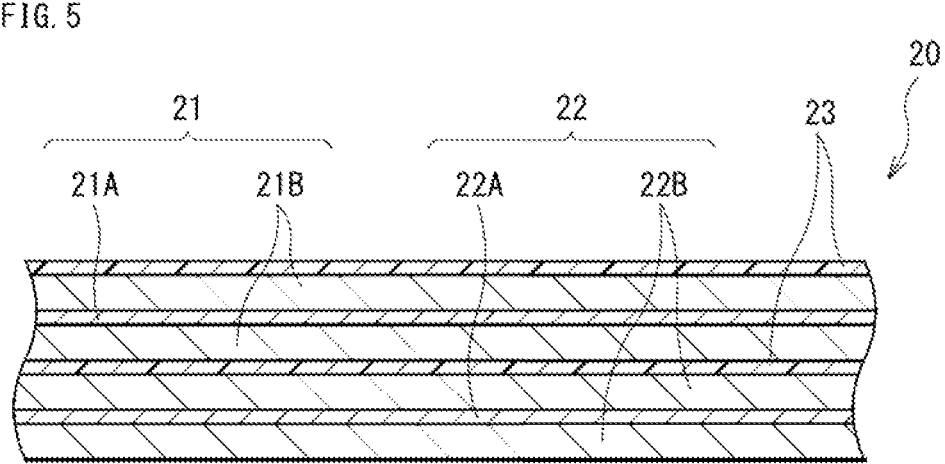
FIG. 5 is an enlarged sectional view of a configuration of a main part of the lithium-ion secondary battery illustrated in FIG. 4.

FIG. 4 illustrates a sectional configuration of the lithium-ion secondary battery. FIG. 5 illustrates, in an enlarged manner, a sectional configuration of a main part, i.e., a wound electrode body 20, of the lithium-ion secondary battery illustrated in FIG. 4. It should be understood that FIG. 5 illustrates only a portion of the wound electrode body 20.

In this lithium-ion secondary battery, as illustrated in FIG. 4, a battery device (the wound electrode body 20) is housed in a cylindrical battery can 11, for example.

Specifically, the lithium-ion secondary battery includes, for example, a pair of insulating plates 12 and 13 and the wound electrode body 20 that are provided inside the battery can 11. The wound electrode body 20 is a structure in which, for example, the positive electrode 21 and the negative electrode 22 are stacked on each other with a separator 23 interposed therebetween, and also in which the stack of the positive electrode 21, the negative electrode 22, and the separator 23 is wound. The wound electrode body 20 is impregnated with an electrolytic solution. The electrolytic solution is a liquid electrolyte.

The battery can 11 has a hollow cylindrical structure with a closed end and an open end, for example, and includes a metal material such as iron. The battery can 11 has a surface that may be plated with, for example, a metal material such as nickel. The insulating plate 12 and the insulating plate 13 are disposed in such a manner as to interpose the wound electrode body 20 therebetween, for example.

For example, a battery cover 14, a safety valve mechanism 15, and a positive temperature coefficient device (a PTC device) 16 are crimped onto the open end of the battery can 11 by means of a gasket 17. The open end of the battery can 11 is thereby sealed. The battery cover 14 includes a material similar to the material included in the battery can 11, for example. The safety valve mechanism 15 and the positive temperature coefficient device 16 are disposed on an inner side of the battery cover 14. The safety valve mechanism 15 is electrically coupled to the battery cover 14 via the positive temperature coefficient device 16. For example, when an internal pressure of the battery can 11 reaches a certain level or higher due to a factor such as an internal short circuit or heating from outside, a disk plate 15A inverts in the safety valve mechanism 15, thereby cutting off the electrical coupling between the battery cover 14 and the wound electrode body 20. In order to prevent abnormal heat generation resulting from a large current, the positive temperature coefficient device 16 increases in electrical resistance with a rise in temperature. The gasket 17 includes an insulating material, for example. The gasket 17 may have a surface on which a material such as asphalt is applied, for example.

A center pin 24 is disposed in a space 20C provided at the winding center of the wound electrode body 20, for example. It should be understood, however, that the center pin 24 may not necessarily be disposed in the space 20C. A positive electrode lead 25 is coupled to the positive electrode 21. The positive electrode lead 25 includes, for example, an electrically conductive material such as aluminum. The positive electrode lead 25 is electrically coupled to the battery cover 14 via the safety valve mechanism 15, for example. A negative electrode lead 26 is coupled to the negative electrode 22. The negative electrode lead 26 includes, for example, an electrically conductive material such as nickel. The negative electrode lead 26 is electrically coupled to the battery can 11, for example.

As illustrated in FIG. 5, the positive electrode 21 includes, for example, a positive electrode current collector 21A, and a positive electrode active material layer 21B provided on the positive electrode current collector 21A. The positive electrode active material layer 21B may be provided on only one side of the positive electrode current collector 21A, or may be provided on each of both sides of the positive electrode current collector 21A, for example. FIG. 5 illustrates an example case where the positive electrode active material layer 21B is provided on each of both sides of the positive electrode current collector 21A.

The positive electrode current collector 21A includes, for example, an electrically conductive material such as aluminum. The positive electrode active material layer 21B includes, as a positive electrode active material, any one or more of positive electrode materials into which lithium is insertable and from which lithium is extractable. The positive electrode active material layer 21B may further include one or more of other materials including, without limitation, a positive electrode binder and a positive electrode conductor.

The positive electrode material includes, for example, a lithium compound. The term "lithium compound" is a generic term for a compound that includes lithium as a constituent element. A reason for this is that a high energy density is obtainable. The lithium compound is not limited to a particular kind, and examples thereof include a lithium composite oxide and a lithium phosphate compound.

The term "lithium composite oxide" is a generic term for an oxide that includes lithium and one or more of other elements as constituent elements. The lithium composite oxide has, for example, any of crystal structures including, without limitation, a layered rock-salt crystal structure and a spinel crystal structure. The term "lithium phosphate compound" is a generic term for a phosphate compound that includes lithium and one or more of other elements as constituent elements. The lithium phosphate compound has, for example, a crystal structure such as an olivine crystal structure.

The "other elements" refer to elements other than lithium. Although not limited to a particular kind, the other elements are preferably elements that belong to groups 2 to 15 in the long periodic table of elements, in particular. A reason for this is that a high voltage is obtainable. Specific examples of the other elements include nickel, cobalt, manganese, and iron.

Examples of the lithium composite oxide having the layered rock-salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$. Examples of the lithium composite oxide having the spinel crystal structure include $LiMn_2O_4$. Examples of the lithium phosphate compound having the olivine crystal structure include $LiFePO_4$, $LiMnPO_4$, $LiMn_{0.5}Fe_{0.5}PO_4$, $LiMn_{0.7}Fe_{0.3}PO_4$, and $LiMn_{0.75}Fe_{0.25}PO_4$.

Details of the positive electrode binder and the positive electrode conductor are, for example, similar to those of the negative electrode binder and the negative electrode conductor, respectively.

The negative electrode 22 has a configuration similar to that of the foregoing negative electrode. Specifically, as illustrated in FIG. 5, the negative electrode 22 includes, for example, a negative electrode current collector 22A and a negative electrode active material layer 22B. The negative electrode current collector 22A and the negative electrode active material layer 22B have configurations similar to those of the negative electrode current collector 1 and the negative electrode active material layer 2, respectively.

The separator 23 includes, for example, a porous film including a material such as a synthetic resin or ceramic. The separator 23 may be a stacked film including two or more porous films that are stacked on each other, in one example. Examples of the synthetic resin include polyethylene.

In particular, the separator 23 may include, for example, the porous film and a polymer compound layer. The porous film serves as a base layer. The polymer compound layer may be provided on only one side of the base layer or on each of both sides of the base layer, for example. A reason for this is that the separator 23 thereby improves in adhesion to the positive electrode 21 and adhesion to the negative electrode 22, thus allowing the wound electrode body 20 to resist being distorted. This reduces a decomposition reaction of the electrolytic solution and also reduces leakage of the electrolytic solution with which the base layer is impregnated.

The polymer compound layer includes a polymer compound such as polyvinylidene difluoride, for example. A reason for this is that such a polymer compound has superior physical strength and is electrochemically stable. For example, the polymer compound layer may include insulating particles such as inorganic particles. A reason for this is that safety improves. The inorganic particles are not limited to a particular kind, and may be particles of a material such as aluminum oxide or aluminum nitride, for example.

The wound electrode body 20 is impregnated with the electrolytic solution, as described above. Accordingly, the separator 23, the positive electrode 21, and the negative electrode 22 are each impregnated with the electrolytic solution, for example. The electrolytic solution includes, for example, a solvent and an electrolyte salt.

The solvent includes, for example, one or more of solvents including a non-aqueous solvent (an organic solvent).

An electrolytic solution including a non-aqueous solvent is a so-called non-aqueous electrolytic solution.

The non-aqueous solvent is not limited to a particular kind; however, examples thereof include a cyclic carbonate ester, a chain carbonate ester, a lactone, a chain carboxylate ester, and a nitrile (mononitrile) compound. Examples of the cyclic carbonate ester include ethylene carbonate and propylene carbonate. Examples of the chain carbonate ester include dimethyl carbonate and diethyl carbonate. Examples of the lactone include γ-butyrolactone and γ-valerolactone. Examples of the chain carboxylate ester include methyl acetate, ethyl acetate, and methyl propionate. Examples of the nitrile compound include acetonitrile, methoxy acetonitrile, and 3-methoxy propionitrile. A reason why such a non-aqueous solvent may be used is that superior characteristics including a superior battery capacity, a superior cyclability characteristic, and a superior storage characteristic are achievable.

Further examples of the non-aqueous solvent include an unsaturated cyclic carbonate ester, a halogenated carbonate ester, a sulfonate ester, an acid anhydride, a dicyano compound (a dinitrile compound), a diisocyanate compound, and a phosphate ester. Examples of the unsaturated cyclic carbonate ester include vinylene carbonate, vinyl ethylene carbonate, and methylene ethylene carbonate. Examples of the halogenated carbonate ester include 4-fluoro-1,3-dioxolane-2-one, 4,5-difluoro-1,3-dioxolane-2-one, and fluoromethyl methyl carbonate. Examples of the sulfonate ester include 1,3-propane sultone and 1,3-propene sultone. Examples of the acid anhydride include succinic anhydride, glutaric anhydride, maleic anhydride, ethane disulfonic anhydride, propane disulfonic anhydride, sulfobenzoic anhydride, sulfopropionic anhydride, and sulfobutyric anhydride. Examples of the dinitrile compound include succinonitrile, glutaronitrile, adiponitrile, and phthalonitrile. Examples of the diisocyanate compound include hexamethylene diisocyanate. Examples of the phosphate ester include trimethyl phosphate and triethyl phosphate. A reason why such a non-aqueous solvent may be used is that one or more of the above-described series of characteristics are further improved.

The electrolyte salt includes, for example, one or more of salts including, without limitation, a lithium salt. The lithium salt is not limited to a particular kind, and examples thereof include lithium hexafluorophosphate ($LiPF_6$), lithium tetrafluoroborate ($LiBF_4$), lithium bis(fluorosulfonyl)imide ($LiN(SO_2F)_2$), lithium bis(trifluoromethane sulfonyl)imide ($LiN(CF_3SO_2)_2$), lithium fluorophosphate ($Li_2PFO_3$), lithium difluorophosphate ($LiPF_2O_2$), and lithium bis(oxalato)borate ($LiC_4BO_8$). A reason why such an electrolyte salt may be used is that superior characteristics including a superior battery capacity, a superior cyclability characteristic, and a superior storage characteristic are achievable.

The content of the electrolyte salt is, for example, more than or equal to 0.3 mol/kg and less than or equal to 3.0 mol/kg with respect to the solvent, but is not particularly limited thereto.

For example, upon charging the lithium-ion secondary battery, lithium ions are extracted from the positive electrode 21, and the extracted lithium ions are inserted into the negative electrode 22 via the electrolytic solution. For example, upon discharging the lithium-ion secondary battery, lithium ions are extracted from the negative electrode 22, and the extracted lithium ions are inserted into the positive electrode 21 via the electrolytic solution.

In a case of manufacturing the lithium-ion secondary battery, for example, the positive electrode 21 is fabricated, the negative electrode 22 is fabricated, the electrolytic solution is prepared, and thereafter the lithium-ion secondary battery is assembled by the following procedures.

First, the positive electrode active material is mixed with materials including, without limitation, the positive electrode binder and the positive electrode conductor on an as-needed basis to thereby obtain a positive electrode mixture. Thereafter, the positive electrode mixture is dispersed or dissolved in a solvent such as an organic solvent or an aqueous solvent to thereby prepare a positive electrode mixture slurry in a paste form. Lastly, the positive electrode mixture slurry is applied on both sides of the positive electrode current collector 21A, following which the applied positive electrode mixture slurry is dried to thereby form the positive electrode active material layers 21B. Thereafter, the positive electrode active material layers 21B may be compression-molded by means of a machine such as a roll pressing machine. In this case, the positive electrode active material layers 21B may be heated. The positive electrode active material layers 21B may be compression-molded a plurality of times.

The negative electrode active material layers 22B are formed on both sides of the negative electrode current collector 22A by a procedure similar to that in the fabrication procedure of the foregoing negative electrode.

The electrolyte salt is added to the solvent, following which the solvent is stirred to dissolve the electrolyte salt in the solvent. In this case, materials including, without limitation, the unsaturated cyclic carbonate ester and the halogenated carbonate ester described above may be added to the solvent as additives.

First, the positive electrode lead 25 is coupled to the positive electrode current collector 21A by a method such as a welding method, and the negative electrode lead 26 is coupled to the negative electrode current collector 22A by a method such as a welding method. Thereafter, the positive electrode 21 and the negative electrode 22 are stacked on each other with the separator 23 interposed therebetween, following which the stack of the positive electrode 21, the negative electrode 22, and the separator 23 is wound to thereby form a wound body. Thereafter, the center pin 24 is disposed in the space 20C provided at the winding center of the wound body.

Thereafter, the wound body is placed into the battery can 11 with the wound body interposed between the insulating plates 12 and 13. In this case, the positive electrode lead 25 is coupled to the safety valve mechanism 15 by a method such as a welding method, and the negative electrode lead 26 is coupled to the battery can 11 by a method such as a welding method. Thereafter, the electrolytic solution is injected into the battery can 11 to thereby impregnate the wound body with the electrolytic solution, causing each of the positive electrode 21, the negative electrode 22, and the separator 23 to be impregnated with the electrolytic solution. As a result, the wound electrode body 20 is formed.

Lastly, the open end of the battery can 11 is crimped by means of the gasket 17 to thereby attach the battery cover 14, the safety valve mechanism 15, and the positive temperature coefficient device 16 to the open end of the battery can 11. Thus, the wound electrode body 20 is sealed in the battery can 11. As a result, the lithium-ion secondary battery is completed.

According to the lithium-ion secondary battery of the cylindrical type, the negative electrode 22 has a configuration similar to that of the foregoing negative electrode. For the reasons described above, this reduces a decomposition reaction of the electrolytic solution and also a rise in electrical resistance in the negative electrode 22 while allowing lithium ions to enter and exit the negative electrode 22 smoothly and stably, thus making it possible to achieve superior battery characteristics. Action and effects related to the lithium-ion secondary battery of the cylindrical type other than the above are similar to those related to the foregoing negative electrode.

Next, a lithium-ion secondary battery of a laminated-film type is described as another example of the lithium-ion secondary battery. In the following description, the components of the lithium-ion secondary battery of the cylindrical type described already are referred to where appropriate with reference to FIGS. 4 and 5.

Figure 6:
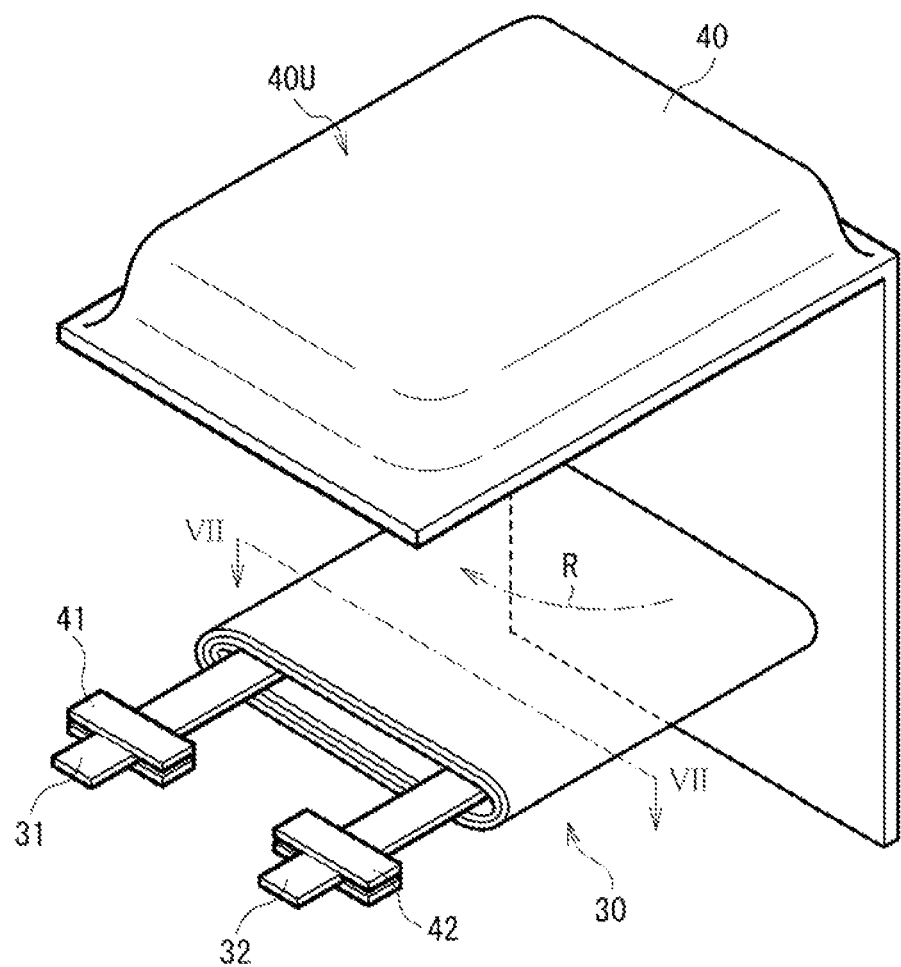
FIG. 6 is a perspective view of a configuration of another lithium-ion secondary battery (laminated-film type) according to an embodiment of the technology.
Figure 7:
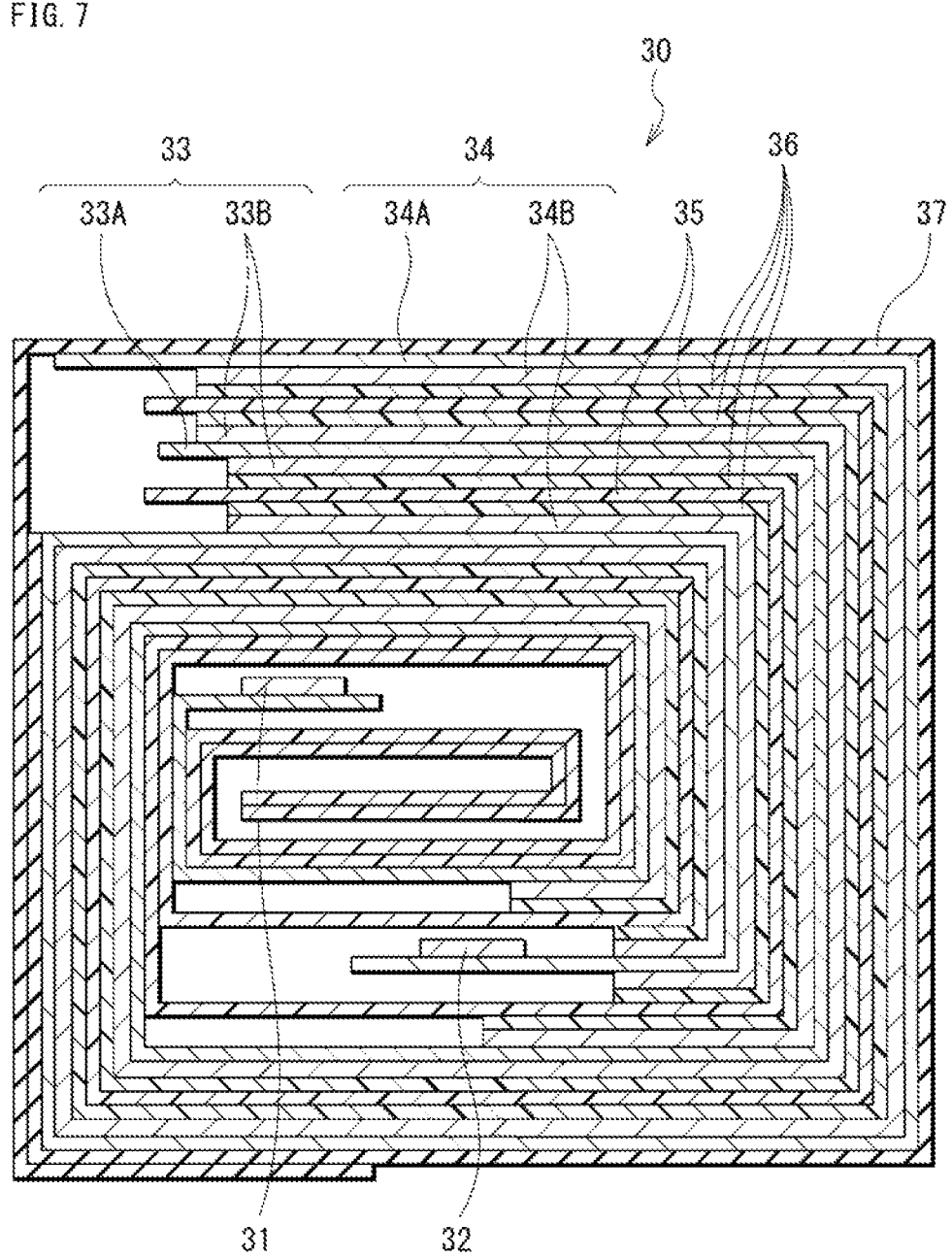
FIG. 7 is an enlarged sectional view of a configuration of a main part of the lithium-ion secondary battery illustrated in FIG. 6.

FIG. 6 is a perspective view of a configuration of another lithium-ion secondary battery. FIG. 7 illustrates, in an enlarged manner, a sectional configuration of a main part, i.e., a wound electrode body 30, of the lithium-ion secondary battery taken along a line VII-VII illustrated in FIG. 6. It should be understood that FIG. 6 illustrates a state in which the wound electrode body 30 and an outer package member 40 are separated away from each other.

In this lithium-ion secondary battery, as illustrated in FIG. 6, the battery device, i.e., the wound electrode body 30 is housed in the outer package member 40, for example. The outer package member 40 is shaped like a film and has softness or flexibility.

The wound electrode body 30 is, for example, a structure in which a positive electrode 33 and a negative electrode 34 are stacked on each other with a separator 35 and an electrolyte layer 36 interposed therebetween and the stack of the positive electrode 33, the negative electrode 34, the separator 35, and the electrolyte layer 36 is wound. The surface of the wound electrode body 30 is protected, for example, by a protective tape 37. The electrolyte layer 36 is interposed between the positive electrode 33 and the separator 35, and is also interposed between the negative electrode 34 and the separator 35, for example.

A positive electrode lead 31 is coupled to the positive electrode 33. The positive electrode lead 31 is led out from inside to outside of the outer package member 40. The positive electrode lead 31 includes, for example, a material similar to the material included in the positive electrode lead 25. The positive electrode lead 31 has a shape such as a thin-plate shape or a meshed shape.

A negative electrode lead 32 is coupled to the negative electrode 34. The negative electrode lead 32 is led out from the inside to the outside of the outer package member 40. A direction in which the negative electrode lead 32 is led out is, for example, similar to a direction in which the positive electrode lead 31 is led out. The negative electrode lead 32 includes, for example, a material similar to the material included in the negative electrode lead 26. The negative electrode lead 32 has a shape similar to that of the positive electrode lead 31, for example.

The outer package member 40 is a single film that is foldable in a direction of an arrow R illustrated in FIG. 6, for example. The outer package member 40 has a portion having a depression 40U, for example. The depression 40U is adapted to receive the wound electrode body 30.

The outer package member 40 is, for example, a laminated body or a laminated film including a fusion-bonding layer, a metal layer, and a surface protective layer that are laminated in this order from the inside toward the outside. In a process of manufacturing the lithium-ion secondary battery, for example, the outer package member 40 is folded in such a manner that portions of the fusion-bonding layer oppose each other to interpose the wound electrode body 30 therebetween. Thereafter, outer edges of the fusion-bonding layer are fusion-bonded to each other. The fusion-bonding layer is, for example, a film that includes a polymer compound such as polypropylene. The metal layer is, for example, a metal foil that includes a metal material such as aluminum. The surface protective layer is, for example, a film that includes a polymer compound such as nylon. The outer package member 40 may include, for example, two laminated films. For example, the two laminated films may be adhered to each other by means of a material such as an adhesive.

For example, a sealing film 41 is interposed between the outer package member 40 and the positive electrode lead 31. The sealing film 41 is adapted to prevent entry of outside air. The sealing film 41 includes, for example, a polyolefin resin such as polypropylene.

For example, a sealing film 42 is interposed between the outer package member 40 and the negative electrode lead 32. The sealing film 42 has a function similar to that of the sealing film 41. The sealing film 42 includes a material that is similar to the material included in the sealing film 41, for example.

The positive electrode 33 includes, for example, a positive electrode current collector 33A and a positive electrode active material layer 33B. The negative electrode 34 includes, for example, a negative electrode current collector 34A and a negative electrode active material layer 34B. The positive electrode current collector 33A, the positive electrode active material layer 33B, the negative electrode current collector 34A, and the negative electrode active material layer 34B respectively have, for example, configurations similar to those of the positive electrode current collector 21A, the positive electrode active material layer 21B, the negative electrode current collector 22A, and the negative electrode active material layer 22B. The separator 35 has, for example, a configuration similar to that of the separator 23.

The electrolyte layer 36 includes an electrolytic solution and a polymer compound. The electrolyte layer 36 described here is a so-called gel electrolyte, in which the electrolytic solution is held by the polymer compound. A reason for this is that high ionic conductivity is obtainable and leakage of the electrolytic solution is prevented. The high ionic conductivity is 1 mS/cm or higher at room temperature, for example. The electrolyte layer 36 may further include, for example, any of other materials including, without limitation, various additives.

The configuration of the electrolytic solution is as described above. The polymer compound includes, for example, a homopolymer, a copolymer, or both. Examples of the homopolymer include polyvinylidene difluoride. Examples of the copolymer include a copolymer of vinylidene fluoride and hexafluoropylene.

Regarding the electrolyte layer 36 which is a gel electrolyte, a solvent included in the electrolytic solution is a broad concept that encompasses not only a liquid material but also an ion-conductive material that is able to dissociate the electrolyte salt. Accordingly, in a case of using an ion-conductive polymer compound, the polymer compound is also encompassed by the "solvent".

For example, upon charging the lithium-ion secondary battery, lithium ions are extracted from the positive electrode 33, and the extracted lithium ions are inserted into the negative electrode 34 via the electrolyte layer 36. For example, upon discharging the lithium-ion secondary battery, lithium ions are extracted from the negative electrode 34, and the extracted lithium ions are inserted into the positive electrode 33 via the electrolyte layer 36.

The lithium-ion secondary battery including the electrolyte layer 36 is manufactured, for example, by any of the following three types of procedures.

[First Procedure]

First, the positive electrode active material layer 33B is formed on each of both sides of the positive electrode current collector 33A to thereby fabricate the positive electrode 33 by a procedure similar to the procedure of fabricating the positive electrode 21. Further, the negative electrode active material layer 34B is formed on each of both sides of the negative electrode current collector 34A to thereby fabricate the negative electrode 34 by a procedure similar to the procedure of fabricating the negative electrode 22.

Thereafter, the electrolytic solution is prepared, following which the prepared electrolytic solution, the polymer compound, and a material such as an organic solvent are mixed to thereby prepare a precursor solution. Thereafter, the precursor solution is applied on the positive electrode 33, following which the applied precursor solution is dried to thereby form the electrolyte layer 36. Further, the precursor solution is applied on the negative electrode 34, following which the applied precursor solution is dried to thereby form the electrolyte layer 36. Thereafter, the positive electrode lead 31 is coupled to the positive electrode current collector 33A by a method such as a welding method, and the negative electrode lead 32 is coupled to the negative electrode current collector 34A by a method such as a welding method. Thereafter, the positive electrode 33 and the negative electrode 34 are stacked on each other with the separator 35 and the electrolyte layer 36 interposed therebetween, following which the stack of the positive electrode 33, the negative electrode 34, the separator 35, and the electrolyte layer 36 is wound to thereby form the wound electrode body 30. Thereafter, the protective tape 37 is attached to the surface of the wound electrode body 30.

Lastly, the outer package member 40 is folded in such a manner as to sandwich the wound electrode body 30, following which the outer edges of the outer package member 40 are bonded to each other by a method such as a thermal fusion bonding method. In this case, the sealing film 41 is interposed between the outer package member 40 and the positive electrode lead 31, and the sealing film 42 is interposed between the outer package member 40 and the negative electrode lead 32. Thus, the wound electrode body 30 is sealed in the outer package member 40. As a result, the lithium-ion secondary battery is completed.

[Second Procedure]

First, the positive electrode 33 and the negative electrode 34 are fabricated. Thereafter, the positive electrode lead 31 is coupled to the positive electrode 33, and the negative electrode lead 32 is coupled to the negative electrode 34. Thereafter, the positive electrode 33 and the negative electrode 34 are stacked on each other with the separator 35 interposed therebetween, following which the stack of the positive electrode 33, the negative electrode 34, and the separator 35 is wound to thereby form a wound body. Thereafter, the protective tape 37 is attached to a surface of the wound body. Thereafter, the outer package member 40 is folded in such a manner as to sandwich the wound body, following which the outer edges, excluding the outer edge of one side, of the outer package member 40 are bonded to each other by a method such as a thermal fusion bonding method. Thus, the wound body is placed into the pouch-shaped outer package member 40.

Thereafter, the electrolytic solution, monomers, and a polymerization initiator are mixed. The monomers are raw materials of the polymer compound. Another material such as a polymerization inhibitor is mixed on an as-needed basis in addition to the electrolytic solution, the monomers, and the polymerization initiator. Thereafter, the mixture is stirred to thereby prepare a composition for electrolyte. Thereafter, the composition for electrolyte is injected into the pouch-shaped outer package member 40, following which the outer package member 40 is sealed by a method such as a thermal fusion bonding method. Lastly, the monomers are thermally polymerized to thereby form the polymer compound. This allows the electrolytic solution to be held by the polymer compound, thereby forming the electrolyte layer 36. Thus, the wound electrode body 30 is sealed in the outer package member 40. As a result, the lithium-ion secondary battery is completed.

[Third Procedure]

First, a wound body is fabricated and then the wound body is placed into the pouch-shaped outer package member 40 by a procedure similar to the second procedure, except for using the separator 35 that includes a polymer compound layer provided on each of both sides of a base layer. Thereafter, the electrolytic solution is injected into the outer package member 40, following which an opening of the outer package member 40 is sealed by a method such as a thermal fusion bonding method. Lastly, the outer package member 40 is heated, with a weight being applied to the outer package member 40, to thereby bring the separator 35 into close contact with each of the positive electrode 33 and the negative electrode 34 with the polymer compound layer interposed therebetween. The polymer compound layer is thereby impregnated with the electrolytic solution and is gelated, forming the electrolyte layer 36. The wound electrode body 30 is thus sealed in the outer package member 40. As a result, the lithium-ion secondary battery is completed.

The third procedure helps to reduce swelling of the lithium-ion secondary battery, in contrast to the first procedure. The third procedure also helps to prevent the solvent and the monomers, which are the raw materials of the polymer compound, from remaining in the electrolyte layer 36, in contrast to the second procedure. This makes it easier for the electrolyte layer 36 to come into close contact with each of the positive electrode 33, the negative electrode 34, and the separator 35.

According to the lithium-ion secondary battery of the laminated-film type, the negative electrode 34 has a configuration similar to that of the foregoing negative electrode. Therefore, superior battery characteristics are achievable as with the lithium-ion secondary battery of the cylindrical type described above. Action and effects related to the lithium-ion secondary battery of the laminated-film type other than the above are similar to those related to the lithium-ion secondary battery of the cylindrical type.

Instead of using the two kinds of negative electrode active materials (the first negative electrode active material particles 100 and the second negative electrode active material particles 200), only one kind of negative electrode active material, that is, only the first negative electrode active material particles 100 may be used, for example. In such a case also, a decomposition reaction of the electrolytic solution is reduced and also a rise in electrical resistance is reduced while entering and exiting of lithium ions into/from the center part 101 are ensured. It is thus possible to achieve similar effects.

Further, in another example, the lithium-ion secondary battery of the laminated-film type may include the electrolytic solution instead of the electrolyte layer 36. In this case, the wound electrode body 30 is impregnated with the electrolytic solution. Therefore, the positive electrode 33, the negative electrode 34, and the separator 35 are each impregnated with the electrolytic solution. Further, after the wound body is placed into the pouch-shaped outer package member 40, the electrolytic solution is injected into the pouch-shaped outer package member 40 to thereby cause the wound body to be impregnated with the electrolytic solution. As a result, the wound electrode body 30 is formed. Similar effects are achievable also in this case.

Applications of the foregoing lithium-ion secondary battery are as follows, for example. It is to be noted that applications of the foregoing negative electrode are similar to those of the lithium-ion secondary battery. Accordingly, the applications of the negative electrode are described below together with the applications of the lithium-ion secondary battery.

The applications of the lithium-ion secondary battery are not particularly limited as long as they are, for example, machines, apparatuses, instruments, devices, or systems (assemblies of a plurality of apparatuses, for example) in which the lithium-ion secondary battery is usable as a driving power source, an electric power storage source for electric power accumulation, or any other source. The lithium-ion secondary battery used as a power source may serve as a main power source or an auxiliary power source. The main power source is preferentially used regardless of the presence of any other power source. The auxiliary power source may be, for example, used in place of the main power source, or may be switched from the main power source on an as-needed basis. In a case where the lithium-ion secondary battery is used as the auxiliary power source, the kind of the main power source is not limited to the lithium-ion secondary battery.

Examples of the applications of the lithium-ion secondary battery include: electronic apparatuses including portable electronic apparatuses; portable life appliances; storage devices; electric power tools; battery packs mountable on laptop personal computers or other apparatuses as detachable power sources; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency. Needless to say, the lithium-ion secondary battery may have applications other than those described above.

EXAMPLES

Examples of the technology are described below.

Experiment Examples 1 to 28

Lithium-ion secondary batteries of the laminated-film type each corresponding to the one illustrated in FIGS. 6 and 7 were fabricated and their respective battery characteristics were evaluated.

The lithium-ion secondary batteries were fabricated by the following procedures.

In a case of fabricating the positive electrode 33, first, 95 parts by mass of the positive electrode active material (lithium cobalt oxide), 3 parts by mass of the positive electrode binder (polyvinylidene difluoride), and 2 parts by mass of the positive electrode conductor (Ketjen black, i.e., amorphous carbon powder) were mixed together to thereby obtain a positive electrode mixture. Thereafter, the positive electrode mixture was put into an organic solvent (N-methyl-2-pyrrolidone), following which the organic solvent was stirred to thereby obtain a positive electrode mixture slurry in a paste form. Thereafter, the positive electrode mixture slurry was applied on both sides of the positive electrode current collector 33A (an aluminum foil having a thickness of 10 μm) by means of a coating apparatus, following which the applied positive electrode mixture slurry was dried with warm air to thereby form the positive electrode active material layers 33B. Lastly, the positive electrode active material layers 33B were compression-molded by means of a roll pressing machine, following which the positive electrode current collector 33A with the positive electrode active material layers 33B formed thereon was cut into a band shape having a width of 70 mm and a length of 800 mm.

In a case of fabricating the negative electrode 34, first, the center parts 101 (silicon-containing material), an aqueous solution of the first compound, an aqueous solution of the second compound, and an aqueous solvent (pure water) were mixed together, following which the mixture was stirred. An aqueous dispersion including the center parts 101, the first compound, and the second compound was thereby prepared. In this case, the electrically conductive substance was added to the aqueous dispersion on an as-needed basis.

As the silicon-containing materials, a simple substance of silicon (Si: median diameter D50=3 μm), a silicon alloy (SiTi$_{0.01}$: median diameter D50=3 μm), and a silicon compound (SiO$_x$ (0.33<x<2): median diameter D50=3 μm) were used. As the first compounds, polyacrylates, i.e., lithium polyacrylate (LPA), sodium polyacrylate (SPA), and potassium polyacrylate (KPA), and polyacrylamide (PAA) were used. As the second compounds, polyvinyl alcohol (PVA) and polyvinyl acetals, i.e., polyvinyl formal (PVH) and polyvinyl butyral (PVB) were used. As the electrically conductive substances, a carbon nanotube (CNT) and a single-walled carbon nanotube (SWCNT) were used.

In a case of preparing the aqueous dispersion, for a comparison purpose, a similar procedure was followed except for omitting one or both of the first compound and the second compound. This resulted in no formation of the covering part 102, as will be described later.

Respective mixture rates (wt %) of the center parts 101, the first compound, the second compound, and the electrically conductive substance were as listed in Table 1.

TABLE 1

| | Center part | | Covering part | | | | | |
| | (Silicon-containing material) | | First compound | | Second compound | | Electrically conductive substance | |
| Experiment example | Kind | Mixture rate (wt %) | Kind | Mixture rate (wt %) | Kind | Mixture rate (wt %) | Kind | Mixture rate (wt %) |
|---|---|---|---|---|---|---|---|---|
| 1 | Si | 98 | SPA | 1 | PVA | 1 | — | — |
| 2 | Si | 97 | SPA | 1 | PVA | 1 | CNT | 1 |
| 3 | Si | 97 | LPA | 1 | PVA | 1 | CNT | 1 |
| 4 | Si | 97 | KPA | 1 | PVA | 1 | CNT | 1 |
| 5 | Si | 97 | PAA | 1 | PVA | 1 | CNT | 1 |
| 6 | Si | 97 | SPA | 1 | PVB | 1 | CNT | 1 |
| 7 | Si | 97 | SPA | 1 | PVH | 1 | CNT | 1 |
| 8 | $SiTi_{0.01}$ | 97 | SPA | 1 | PVA | 1 | CNT | 1 |
| 9 | SiO | 97 | SPA | 1 | PVA | 1 | CNT | 1 |
| 10 | Si | 98.8 | SPA | 0.1 | PVA | 0.1 | CNT | 1 |
| 11 | Si | 89 | SPA | 5 | PVA | 5 | CNT | 1 |
| 12 | Si | 79 | SPA | 10 | PVA | 10 | CNT | 1 |
| 13 | Si | 97.99 | SPA | 1 | PVA | 1 | CNT | 0.01 |
| 14 | Si | 93 | SPA | 1 | PVA | 1 | CNT | 5 |
| 15 | Si | 88 | SPA | 1 | PVA | 1 | CNT | 10 |
| 16 | Si | 78 | SPA | 1 | PVA | 1 | CNT | 20 |
| 17 | Si | 97.999 | SPA | 1 | PVA | 1 | SWCNT | 0.001 |
| 18 | Si | 100 | — | — | — | — | — | — |
| 19 | Si | 98 | SPA | 2 | — | — | — | — |
| 20 | Si | 98 | — | — | PVA | 2 | — | — |

Thereafter, using a spray dryer (manufactured by Fujisaki Electric Co., Ltd.), the aqueous dispersion was sprayed and then dried. As a result, the covering part 202 including the first compound and the second compound was formed to cover the surface of the center part 101. The first negative electrode active material particles 100 each including the center part 101 and the covering part 102 were thus obtained. Furthermore, owing to the use of the spray drying method, two or more of the first negative electrode active material particles 100 came into close contact with each other, resulting in the formation of the composite particles 100C.

Thereafter, the first negative electrode active material particles 100 described above, the second negative electrode active material particles 200 (mesocarbon microbeads (MCMB) as the carbon-containing material: median diameter D50=21 μm), the negative electrode binder, the negative electrode conductor (carbon nanotube), and a non-aqueous solvent (N-methyl-2-pyrrolidone) were mixed together, following which the mixture was kneaded and stirred using a planetary centrifugal mixer. A non-aqueous dispersion including the first negative electrode active material particles 100, the second negative electrode active material particles 200, the negative electrode binder, and the negative electrode conductor was thereby obtained.

As the negative electrode binders, polyvinylidene difluoride (PVDF), polyimide (PI), and aramid (AR) were used.

The mixture rates (wt %) of the first negative electrode active material particles 100, the second negative electrode active material particles 200, and the negative electrode binder, and the weight proportions (wt %) were as listed in Tables 2 and 3. It should be understood that the mixture rate of the negative electrode conductor was set to 1 wt %.

TABLE 2

| | First negative electrode active material particle | | | | Second negative electrode active material particle | | Negative electrode binder | | | |
| Experiment example | Center part | Covering part | Mixture rate (wt %) | Weight proportion (wt %) | Carbon-containing material | Mixture rate (wt %) | Kind | Mixture rate (wt %) | Cycle retention rate (%) | Load retention rate (%) |
|---|---|---|---|---|---|---|---|---|---|---|
| 1 | Si | SPA + PVA | 10 | 10.4 | MCMB | 86 | PVDF | 3 | 141 | 131 |
| 2 | Si | SPA + PVA + CNT | 10 | 10.4 | MCMB | 86 | PVDF | 3 | 147 | 135 |
| 3 | Si | LPA + PVA + CNT | 10 | 10.4 | MCMB | 86 | PVDF | 3 | 146 | 134 |
| 4 | Si | KPA + PVA + CNT | 10 | 10.4 | MCMB | 86 | PVDF | 3 | 145 | 135 |
| 5 | Si | PAA + PVA + CNT | 10 | 10.4 | MCMB | 86 | PVDF | 3 | 146 | 135 |
| 6 | Si | SPA + PVB + CNT | 10 | 10.4 | MCMB | 86 | PVDF | 3 | 149 | 136 |
| 7 | Si | SPA + PVH + CNT | 10 | 10.4 | MCMB | 86 | PVDF | 3 | 145 | 132 |
| 8 | $SiTi_{0.01}$ | SPA + PVA + CNT | 10 | 10.4 | MCMB | 86 | PVDF | 3 | 150 | 136 |
| 9 | SiO | SPA + PVA + CNT | 10 | 10.4 | MCMB | 86 | PVDF | 3 | 154 | 137 |
| 10 | Si | SPA + PVA + CNT | 10 | 10.4 | MCMB | 86 | PVDF | 3 | 115 | 115 |
| 11 | Si | SPA + PVA + CNT | 10 | 10.4 | MCMB | 86 | PVDF | 3 | 156 | 144 |
| 12 | Si | SPA + PVA + CNT | 10 | 10.4 | MCMB | 86 | PVDF | 3 | 160 | 147 |
| 13 | Si | SPA + PVA + CNT | 10 | 10.4 | MCMB | 86 | PVDF | 3 | 143 | 132 |
| 14 | Si | SPA + PVA + CNT | 10 | 10.4 | MCMB | 86 | PVDF | 3 | 150 | 136 |
| 15 | Si | SPA + PVA + CNT | 10 | 10.4 | MCMB | 86 | PVDF | 3 | 151 | 137 |
| 16 | Si | SPA + PVA + CNT | 10 | 10.4 | MCMB | 86 | PVDF | 3 | 152 | 139 |

TABLE 3

| | | First negative electrode active material particle | | | Second negative electrode active material particle | | Negative electrode binder | | | |
|---|---|---|---|---|---|---|---|---|---|---|
| Experiment example | Center part | Covering part | Mixture rate (wt %) | Weight proportion (wt %) | Carbon-containing material | Mixture rate (wt %) | Kind | Mixture rate (wt %) | Cycle retention rate (%) | Load retention rate (%) |
| 17 | Si | SPA + PVA + SWCNT | 10 | 10.4 | MCMB | 86 | PVDF | 3 | 143 | 132 |
| 21 | Si | SPA + PVA + CNT | 10 | 10.4 | MCMB | 86 | PI | 3 | 151 | 137 |
| 22 | Si | SPA + PVA + CNT | 10 | 10.4 | MCMB | 86 | AR | 3 | 147 | 134 |
| 23 | Si | SPA + PVA + CNT | 20 | 20.8 | MCMB | 76 | PVDF | 3 | 135 | 119 |
| 24 | Si | SPA + PVA + CNT | 30 | 31.3 | MCMB | 66 | PVDF | 3 | 125 | 107 |
| 25 | Si | SPA + PVA + CNT | 94 | 100 | — | — | PVDF | 5 | 42 | 38 |
| 18 | Si | — | 10 | — | MCMB | 86 | PVDF | 3 | 100 | 100 |
| 19 | Si | SPA | 10 | — | MCMB | 86 | PVDF | 3 | 128 | 125 |
| 20 | Si | PVA | 10 | — | MCMB | 86 | PVDF | 3 | 99 | 99 |
| 26 | Si | — | 20 | — | MCMB | 76 | PVDF | 3 | 92 | 93 |
| 27 | Si | — | 30 | — | MCMB | 66 | PVDF | 3 | 86 | 88 |
| 28 | Si | — | 94 | — | — | — | PVDF | 5 | 22 | 26 |

Thereafter, the non-aqueous dispersion was applied on both sides of the negative electrode current collector 34A (a copper foil having a thickness of 8 μm) by means of a coating apparatus, following which the applied non-aqueous dispersion was dried with warm air to thereby form the negative electrode active material layers 34B. Lastly, the negative electrode active material layers 34B were compression-molded by means of a roll pressing machine, following which the negative electrode current collector 34A with the negative electrode active material layers 34B formed thereon was cut into a band shape having a width of 72 mm and a length of 810 mm.

In a case of preparing the electrolytic solution, the electrolyte salt ($LiPF_6$) was added to a solvent (ethylene carbonate and ethyl methyl carbonate), following which the solvent was stirred. In this case, the mixture ratio (the weight ratio) between ethylene carbonate and ethyl methyl carbonate in the solvent was set to 50:50, and the content of the electrolyte salt with respect to the solvent was set to 1 mol/$dm^3$ (=1 mol/l).

In a case of assembling the lithium-ion secondary battery, first, the positive electrode lead 31 including aluminum was welded to the positive electrode current collector 33A, and the negative electrode lead 32 including copper was welded to the negative electrode current collector 34A. Thereafter, the positive electrode 33 and the negative electrode 34 were stacked on each other with the separator 35 (a fine-porous polyethylene film having a thickness of 25 μm) interposed therebetween to thereby obtain a stacked body. Thereafter, the stacked body was wound in a longitudinal direction, following which the protective tape 37 was attached to the outermost periphery of the stacked body to thereby obtain a wound body.

Thereafter, the outer package member 40 was folded in such a manner as to sandwich the wound body, following which the outer edges of three sides of the outer package member 40 were thermal fusion bonded to each other. As the outer package member 40, a moisture-proof aluminum laminated film was used in which a nylon film having a thickness of 25 μm, an aluminum foil having a thickness of 40 μm, and a polypropylene film having a thickness of 30 μm were stacked in this order from the outer side. In this case, the sealing film 41 (a polypropylene film) was interposed between the positive electrode lead 31 and the outer package member 40, and the sealing film 42 (a polypropylene film) was interposed between the negative electrode lead 32 and the outer package member 40. Lastly, the electrolytic solution was injected into the outer package member 40 to thereby impregnate the wound body with the electrolytic solution. Thereafter, the outer edges of the remaining one side of the outer package member 40 were thermal fusion bonded to each other in a reduced-pressure environment.

Thus, the wound electrode body 30 was fabricated, being sealed in the outer package member 40. As a result, the lithium-ion secondary battery of the laminated-film type was completed.

In a case of fabricating the lithium-ion secondary battery, the thickness of the positive electrode active material layer 33B and the thickness of the negative electrode active material layer 34B were each adjusted to set a capacity ratio to 0.9. A procedure to calculate the capacity ratio is as follows.

Figure 8:
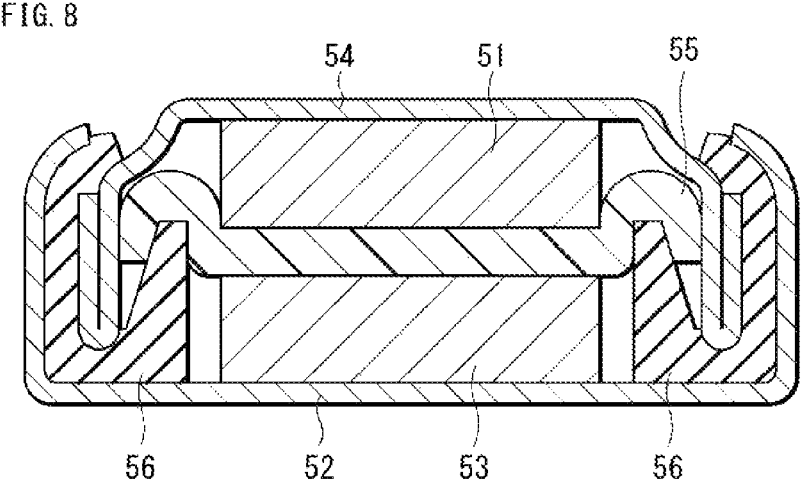
FIG. 8 is a sectional view of a configuration of a test lithium-ion secondary battery (coin type) according to an embodiment of the technology.

FIG. 8 illustrates a sectional configuration of a test lithium-ion secondary battery (a coin type). In this lithium-ion secondary battery, a test electrode 51 is housed in an outer package cup 54, and a counter electrode 53 is housed in an outer package can 52. The test electrode 51 and the counter electrode 53 are stacked on each other with a separator 55 interposed therebetween. The outer package can 52 and the outer package cup 54 are crimped to each other by means of a gasket 56. The test electrode 51, the counter electrode 53, and the separator 55 are each impregnated with an electrolytic solution.

In a case of designing the capacity ratio, first, the test electrode 51 was fabricated in which a positive electrode active material layer was formed on one side of a positive electrode current collector. Thereafter, the lithium-ion secondary battery of the coin type illustrated in FIG. 8 was fabricated using the test electrode 51 and the counter electrode 53 (a lithium metal plate). The positive electrode current collector, the positive electrode active material layer, and the separator 55 had configurations similar to those of the positive electrode current collector 33A, the positive electrode active material layer 33B, and the separator 35 used in the lithium-ion secondary battery of the laminated-film type described above, respectively. Further, the electrolytic solution had a composition similar to the composition of the electrolytic solution used in the lithium-ion secondary battery of the laminated-film type described above. Thereafter, the lithium-ion secondary battery was charged to measure the electrical capacity, following which a charge capacity per thickness of the positive electrode active material layer, i.e., the charge capacity of the positive electrode, was calculated. Upon the charging, the lithium-ion secondary battery was charged with a constant current of 0.1 C until a voltage reached 4.4 V.

Thereafter, a charge capacity of the negative electrode was calculated by a similar procedure. Specifically, the test electrode 51 was fabricated in which a negative electrode active material layer was formed on one side of a negative electrode current collector, and a lithium-ion secondary battery of the coin type was fabricated using the test electrode 51 and the counter electrode 53 (a lithium metal plate), following which the lithium-ion secondary battery was charged to measure the electrical capacity. Thereafter, a charge capacity per thickness of the negative electrode active material layer, i.e., the charge capacity of the negative electrode, was calculated. Upon the charging, the lithium-ion secondary battery was charged with a constant current of 0.1 C until a voltage reached 0 V, and was thereafter charged with a constant voltage of 0 V until a current reached 0.01 C.

"0.1 C" and "0.01 C" are values of currents that cause a battery capacity (a theoretical capacity) to be completely discharged in 10 hours and 100 hours, respectively.

Lastly, on the basis of the charge capacity of the positive electrode and the charge capacity of the negative electrode, a capacity ratio was calculated as follows: capacity ratio=charge capacity of positive electrode/charge capacity of negative electrode.

A cyclability characteristic and a load characteristic were examined as the battery characteristics of the lithium-ion secondary batteries. The examination revealed the results described in Tables 2 and 3.

In a case of examining the cyclability characteristic, first, the lithium-ion secondary battery was charged and discharged for one cycle in an ambient temperature environment (23° C.) in order to stabilize a state of the lithium-ion secondary battery. Upon the charging, the lithium-ion secondary battery was charged with a current of 0.2 C until a voltage reached 4.4 V, and was thereafter charged further with a voltage of 4.4 V until a current reached 0.025 C. Upon the discharging, the lithium-ion secondary battery was discharged with a current of 0.2 C until the voltage reached 3.0 V. "0.2 C" and "0.025 C" are values of currents that cause a battery capacity (a theoretical capacity) to be completely discharged in 5 hours and 40 hours, respectively.

Thereafter, the lithium-ion secondary battery was charged and discharged for another cycle in the same environment, and a second-cycle discharge capacity was measured. Conditions of the charging and the discharging for the second cycle were similar to those for the initial cycle except that the current for the charging and the current for the discharging were each changed to 0.5 C. "0.5 C" is a value of a current that causes a battery capacity (a theoretical capacity) to be completely discharged in 2 hours.

Thereafter, the lithium-ion secondary battery was repeatedly charged and discharged in the same environment until the total number of cycles reached 100 cycles, and a 100th-cycle discharge capacity was measured. Conditions of the charging and the discharging were similar to those for the second cycle.

Lastly, a cycle retention rate was calculated as follows: cycle retention rate (%)=(100th-cycle discharge capacity/second-cycle discharge capacity)×100.

In Tables 2 and 3, the cycle retention rate is presented as a normalized value with respect to a value of the cycle retention rate of Experiment example 18 assumed as 100. Experiment example 18 is an example in which the covering part 102 was not formed.

In a case of examining the load characteristic, a lithium-ion secondary battery was used that had already undergone stabilization of the battery state by a procedure similar to that in the case of examining the cyclability characteristic, i.e., that had undergone charging and discharging for one cycle. The lithium-ion secondary battery was further charged and discharged for three cycles in an ambient temperature environment (23° C.) with the current value at the time of the discharging being varied, and a second-cycle discharge capacity and a fourth-cycle discharge capacity were measured. On the basis of the measurement results, a load retention rate was calculated as follows: load retention rate (%)=(fourth-cycle discharge capacity/second-cycle discharge capacity)×100.

Upon the charging at each of the second to fourth cycles, the lithium-ion secondary battery was charged with a current of 0.2 C until a voltage reached 4.4 V, and was thereafter charged further with a voltage of 4.4 V until a current reached 0.025 C. Upon the discharging at the second cycle, the lithium-ion secondary battery was discharged with a current of 0.2 C until the voltage reached 3 V. Upon the discharging at the third cycle, the lithium-ion secondary battery was discharged with a current of 0.5 C until the voltage reached 3 V. Upon the discharging at the fourth cycle, the lithium-ion secondary battery was discharged with a current of 2 C until the voltage reached 3 V. "2 C" is a value of a current that causes a battery capacity (a theoretical capacity) to be completely discharged in 0.5 hours.

In Tables 2 and 3, the cycle retention rate is presented as a normalized value with respect to the value of the cycle retention rate of Experiment example 18 assumed as 100. Experiment example 18 is an example in which the covering part 102 was not formed.

As indicated in Tables 2 and 3, the cycle retention rate and the load retention rate each varied greatly depending on the configuration of the negative electrode 34.

Specifically, in a case where the covering part 102 included only the first compound (SPA) (Experiment example 19), the cycle retention rate increased and the load retention rate also increased as compared with a case where the covering part 102 did not include the first compound (Experiment example 18).

Further, in a case where the covering part 102 included only the second compound (PVA) (Experiment example 20), the cycle retention rate decreased and the load retention rate also decreased as compared with the case where the covering part 102 did not include the second compound (Experiment example 18).

These results may suggest that, even if the covering part 102 includes both of the first compound and the second compound, the cycle retention rate and the load retention rate would each decrease as compared with the case where the covering part 102 includes only the first compound (Experiment example 19).

However, in a case where the covering part 102 actually included both of the first compound and the second compound (Experiment example 1), the cycle retention rate increased and the load retention rate also increased as compared with the case where the covering part 102 included only the first compound (Experiment example 19). Such a tendency was observed similarly even if the configuration of the covering part 102 was changed (Experiment examples 2 to 17 and 21 to 28) in the cases where the covering part 102 included both of the first compound and the second compound. In such cases, in particular, a similar tendency was observed not only in a case where the negative electrode 34 included the first negative electrode active material particles 100 and the second negative electrode active material particles 200 together but also in a case where the negative electrode 34 included only the first negative electrode active material particles 100 (Experiment examples 25 and 28).

Such an increase in each of the cycle retention rate and the load retention rate in the cases where the covering part 102 included both of the first compound and the second compound is considered to be a result of an interaction between the first compound and the second compound. The interaction between the first compound and the second compound resulted in a unique advantage that a decomposition reaction of the electrolytic solution was reduced and also a rise in electrical resistance was reduced at the first negative electrode active material particles 100 while smooth and stable entering and exiting of lithium ions into/from the first negative electrode active material particles 100 were ensured, which helped to suppress a reduction in each of the cycle retention rate and the load retention rate.

In particular, tendencies described below were observed in the cases where the covering part 102 included both of the first compound and the second compound (Experiment example 1 to 17 and 21 to 25).

Firstly, if polyacrylate (e.g., SPA) and polyacrylamide (PAA) were used as the first compound and polyvinyl alcohol (PVA) and polyvinyl acetal (e.g., PVH) were used as the second compound, a high cycle retention rate and a high load retention rate were obtained.

Secondly, if the content of the first compound in the covering part 102 was in the range from 0.1 wt % to 10 wt % both inclusive, and the content of the second compound in the covering part 102 was in the range from 0.1 wt % to 10 wt % both inclusive, a high cycle retention rate and a high load retention rate were obtained.

Thirdly, in the cases where the negative electrode 34 included the first negative electrode active material particles 100 and the second negative electrode active material particles 200, if the weight proportion was greater than or equal to 10 wt % and less than 100 wt %, a high cycle retention rate and a high load retention rate were obtained.

Fourthly, if the covering part 102 included the electrically conductive substance (e.g., CNT), the cycle retention rate further increased and also the load retention rate further increased as compared with a case where the covering part 102 included no electrically conductive substance. In this case, if the content of the electrically conductive substance in the covering part 102 was in the range from 0.001 wt % to 20 wt % both inclusive, a high cycle retention rate and a high load retention rate were obtained.

As indicated in Tables 1 to 3, in a case where: the negative electrode 34 included the first negative electrode active material particles 100 and the second negative electrode active material particles 200; the first negative electrode active material particles 100 each included the center part 101 including the silicon-containing material and the covering part 102 including the first compound and the second compound; the second negative electrode active material particles 200 each included the carbon-containing material; the first compound included, without limitation, polyacrylate; and the second compound included, without limitation, polyvinyl alcohol, the cyclability characteristic and the load characteristic were each improved. As a result, the lithium-ion secondary battery achieved superior battery characteristics.

Although the technology has been described above with reference to some embodiments and Examples, the technology is not limited to those described with reference to the embodiments and the Examples above, and is therefore modifiable in a variety of ways.

For example, in order to describe the configuration of the secondary battery according to the technology, the description has been given with reference to the example cases where the battery structures are of the cylindrical type, the laminated-film type, and the coin type, and the battery devices have a wound structure. However, the secondary battery according to the technology is also applicable to a case where the battery structure is of any of other types including a prismatic type and a button type, and also a case where the battery device has any other structure such as a stacked structure.

Further, for example, the electrolytic solution for the secondary battery of one embodiment of the technology may be applied not only to secondary batteries but also for to other electrochemical devices. Examples of the other electrochemical devices include capacitors.

The effects described herein are mere examples and non-limiting. Accordingly, any other effect may be achieved.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lithium-ion secondary battery comprising:
   a positive electrode;
   a negative electrode including first negative electrode active material particles; and
   an electrolytic solution,
   wherein the first negative electrode active material particles each include a center part and a covering part,
   wherein the center part includes a silicon-containing material, and the covering part is provided on a surface of the center part and includes a first compound and a second compound,
   wherein the first compound includes at least one of polyacrylate or polyacrylamide, and the second compound includes at least one of polyvinyl alcohol or polyvinyl acetal, and
   wherein the first compound and the second compound are mixed together in the covering part.

2. The lithium-ion secondary battery according to claim 1, wherein the negative electrode includes a composite particle including two or more of the first negative electrode active material particles in close contact with each other.

3. The lithium-ion secondary battery according to claim 1, wherein
   the polyacrylate includes at least one of lithium polyacrylate, sodium polyacrylate, or potassium polyacrylate, and
   the polyvinyl acetal includes at least one of polyvinyl formal or polyvinyl butyral.

4. The lithium-ion secondary battery according to claim 2, wherein
   the polyacrylate includes at least one of lithium polyacrylate, sodium polyacrylate, or potassium polyacrylate, and
   the polyvinyl acetal includes at least one of polyvinyl formal or polyvinyl butyral.

5. The lithium-ion secondary battery according to claim 1, wherein
- a content of the first compound in the covering part is from 0.1 weight percent to 10 weight percent, and
- a content of the second compound in the covering part is from 0.1 weight percent to 10 weight percent.

6. The lithium-ion secondary battery according to claim 2, wherein
- a content of the first compound in the covering part is from 0.1 weight percent to 10 weight percent, and
- a content of the second compound in the covering part is from 0.1 weight percent to 10 weight percent.

7. The lithium-ion secondary battery according to claim 3, wherein
- a content of the first compound in the covering part is from 0.1 weight percent to 10 weight percent, and
- a content of the second compound in the covering part is from 0.1 weight percent to 10 weight percent.

8. The lithium-ion secondary battery according to claim 1, wherein the covering part further includes an electrically conductive substance.

9. The lithium-ion secondary battery according to claim 8, wherein the electrically conductive substance includes at least one of a carbon nanotube, a single-walled carbon nanotube, a carbon nanofiber, carbon black, or acetylene black.

10. The lithium-ion secondary battery according to claim 8, wherein a content of the electrically conductive substance in the covering part is from 0.001 weight percent to 20 weight percent.

11. The lithium-ion secondary battery according to claim 1, wherein
- the negative electrode further includes second negative electrode active material particles, and
- the second negative electrode active material particles each include a carbon-containing material.

12. The lithium-ion secondary battery according to claim 11, wherein a proportion of a weight of the first negative electrode active material particles to a sum total of the weight of the first negative electrode active material particles and a weight of the second negative electrode active material particles is greater than or equal to 10 weight percent and less than 100 weight percent.

13. A negative electrode for a lithium-ion secondary battery, the negative electrode comprising
- first negative electrode active material particles each including a center part and a covering part, the center part including a silicon-containing material, the covering part being provided on a surface of the center part and including a first compound and a second compound,
- the first compound including at least one of polyacrylate or polyacrylamide,
- the second compound including at least one of polyvinyl alcohol or polyvinyl acetal, and
- wherein the first compound and the second compound are mixed together in the covering part.

\* \* \* \* \*